(12) United States Patent
Kobayashi

(10) Patent No.: US 9,616,894 B2
(45) Date of Patent: Apr. 11, 2017

(54) CONTINUOUSLY VARIABLE TRANSMISSION

(71) Applicant: HONDA MOTOR CO., LTD., Tokyo (JP)

(72) Inventor: Tsunehiro Kobayashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 92 days.

(21) Appl. No.: 14/768,310

(22) PCT Filed: Apr. 7, 2014

(86) PCT No.: PCT/JP2014/060064
§ 371 (c)(1),
(2) Date: Aug. 17, 2015

(87) PCT Pub. No.: WO2014/175049
PCT Pub. Date: Oct. 30, 2014

(65) Prior Publication Data
US 2016/0009286 A1 Jan. 14, 2016

(30) Foreign Application Priority Data
Apr. 23, 2013 (JP) ................................ 2013-090491

(51) Int. Cl.
*F16H 29/04* (2006.01)
*F16H 61/66* (2006.01)
(Continued)

(52) U.S. Cl.
CPC ...... *B60W 30/18072* (2013.01); *B60W 10/04* (2013.01); *B60W 10/101* (2013.01);
(Continued)

(58) Field of Classification Search
CPC .......... F16H 29/04; F16H 61/66; F16H 29/22; B60W 30/18072
See application file for complete search history.

(56) References Cited

U.S. PATENT DOCUMENTS 8,602,936 B2 * 12/2013 Ichikawa ............... B60K 6/383
475/162
8,911,325 B2 * 12/2014 Sasaki .................. B60W 10/06
475/170
(Continued)

FOREIGN PATENT DOCUMENTS

JP 2012-201339 A 10/2012
JP 2013-1190 A 1/2013
(Continued)

OTHER PUBLICATIONS

International Search Report dated Jul. 8, 2014, issued in counterpart application No. PCT/JP2014/060064 (2 pages).

*Primary Examiner* — Jacob S Scott
*Assistant Examiner* — Tinh Dang
(74) *Attorney, Agent, or Firm* — Westerman, Hattori, Daniels & Adrian, LLP

(57) ABSTRACT

A stepless transmission 1 is provided for preventing drive wheels from being driven despite the driver's intention during vehicle deceleration. A control device 40: when the required drive force of the vehicle is 0, controls the output rotational speed Ne of a travel drive source 50 to be Ne2, and controls the transmission gear ratio i of the transmission 1 so that the transmission 1 in the case where the Ne is Ne1 changes from a first state to a second state; and when the vehicle speed V is less than a boundary speed Vgn, controls the ratio i to be a state maintaining transmission gear ratio ign that enables the first state to be maintained even during vehicle deceleration. In the second state a rotational drive
(Continued)

force is transmitted from an input shaft 2 to an output shaft 3. In the first state the transmission is prevented.

6 Claims, 10 Drawing Sheets

(51) Int. Cl.
    *F16H 29/22*     (2006.01)
    *B60W 30/18*     (2012.01)
    *B60W 10/04*     (2006.01)
    *B60W 10/101*     (2012.01)
    *F16H 59/44*     (2006.01)

(52) U.S. Cl.
    CPC   *B60W 30/18027* (2013.01); *B60W 30/18054* (2013.01); *F16H 29/04* (2013.01); *F16H 29/22* (2013.01); *F16H 61/66* (2013.01); *B60W 2510/0638* (2013.01); *B60W 2510/081* (2013.01); *B60W 2510/18* (2013.01); *B60W 2520/10* (2013.01); *B60W 2520/105* (2013.01); *B60W 2710/0644* (2013.01); *B60W 2710/081* (2013.01); *B60W 2710/1005* (2013.01); *F16H 59/44* (2013.01)

(56) References Cited

U.S. PATENT DOCUMENTS

| | | | |
|---|---|---|---|
| 9,045,128 B2 * | 6/2015 | Iwadare | B60W 10/06 |
| 9,050,974 B2 * | 6/2015 | Kobayashi | F16H 29/04 |
| 9,533,669 B2 * | 1/2017 | Kono | B60W 10/02 |
| 2012/0252630 A1 | 10/2012 | Sasaki | |

FOREIGN PATENT DOCUMENTS

| | | |
|---|---|---|
| JP | 2013-47492 A | 3/2013 |
| JP | 2013-61043 A | 4/2013 |

* cited by examiner

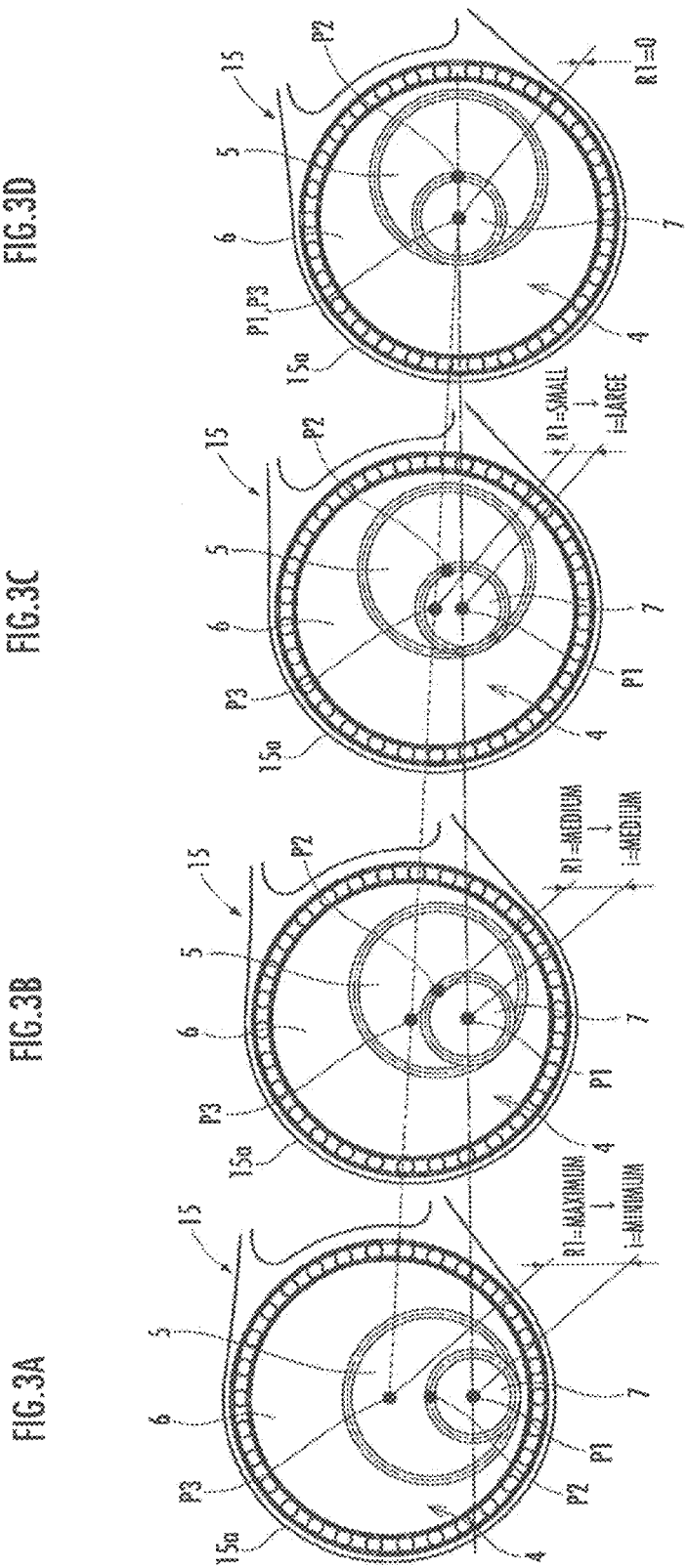

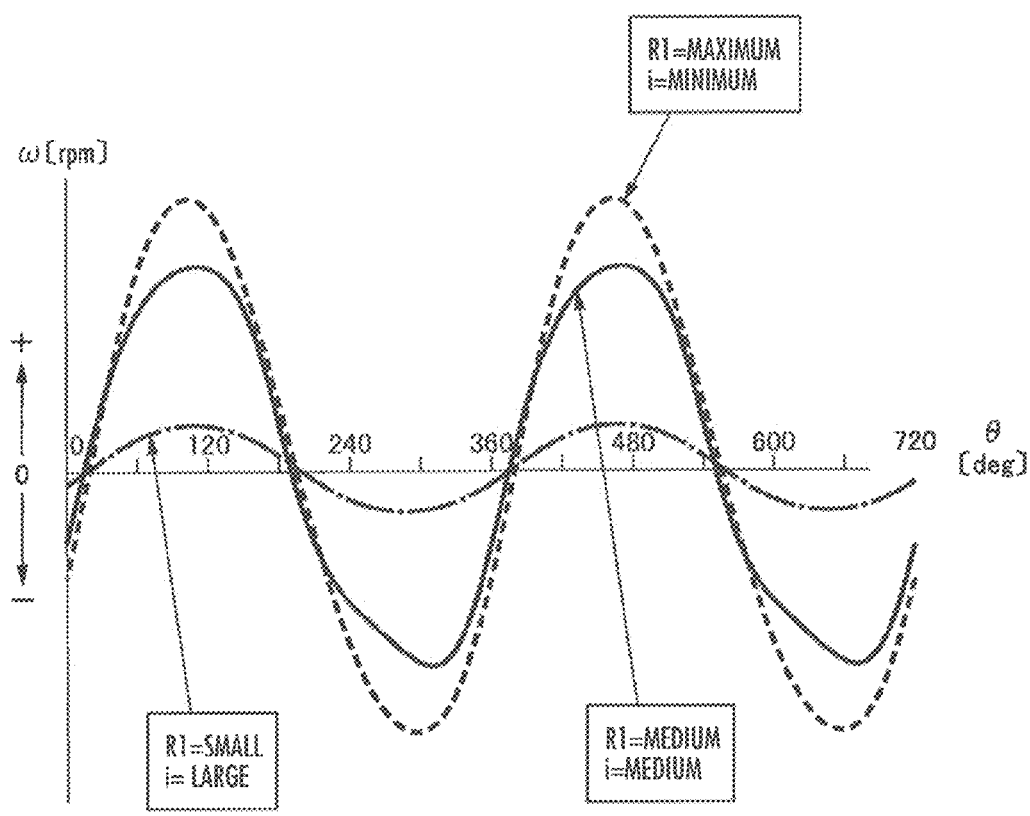

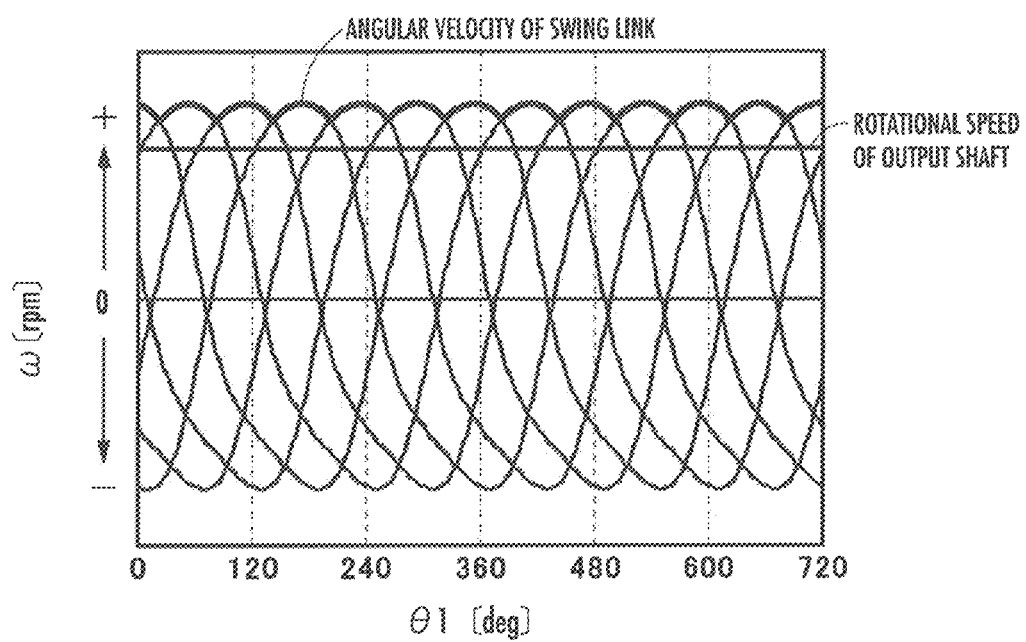

LARGER TRANSMISSION GEAR RATIO (i) ←————— —————→ SMALLER TRANSMISSION GEAR RATIO (i)

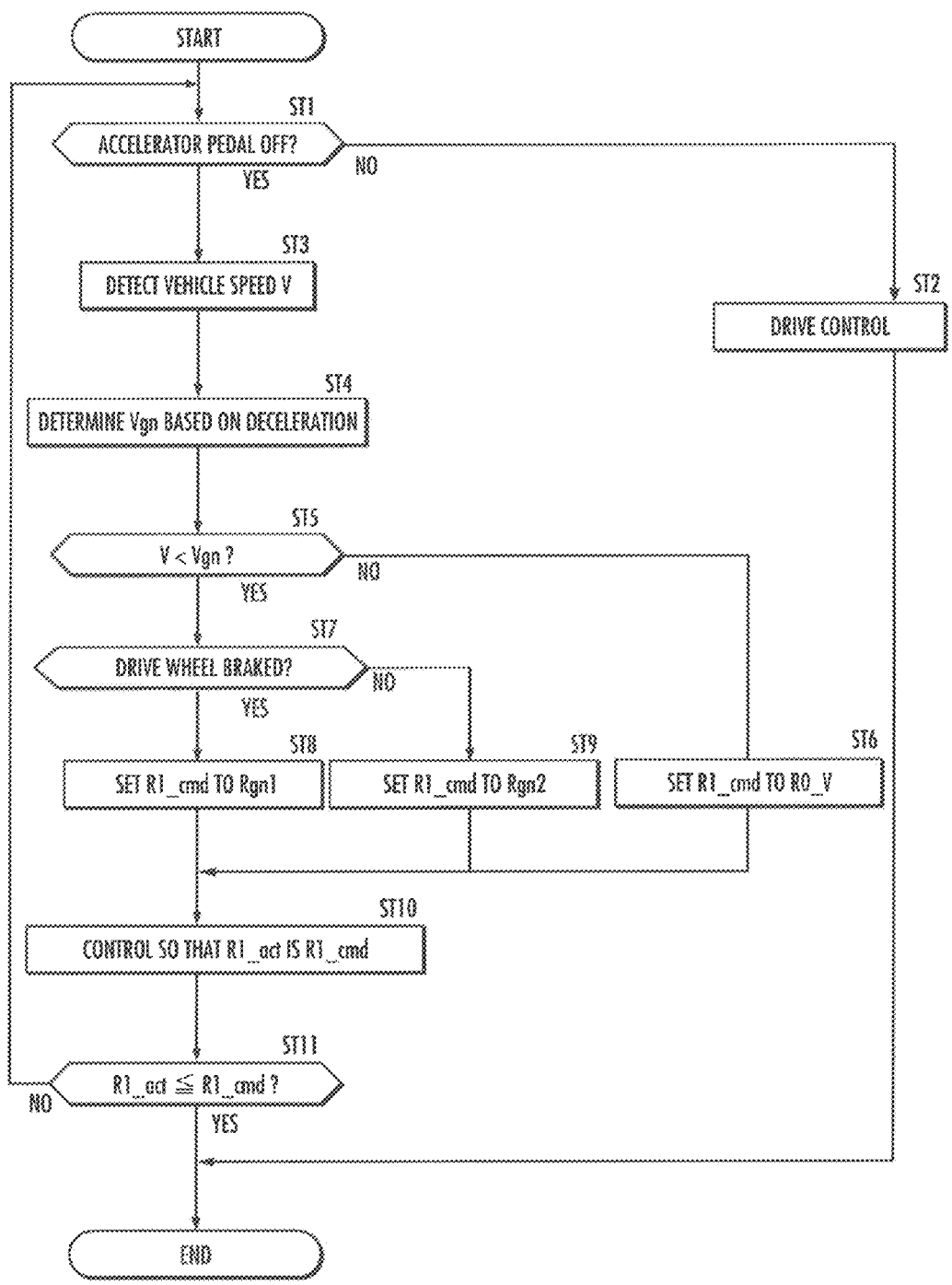

CONTINUOUSLY VARIABLE TRANSMISSION

TECHNICAL FIELD

The present invention relates to a stepless transmission capable of steplessly adjusting the transmission gear ratio.

BACKGROUND ART

A conventionally proposed stepless transmission includes a one-way clutch capable of transmitting only power from a travel drive source to drive wheels (for example, see Patent Literature 1). A first target rotational speed is defined in this stepless transmission. The first target rotational speed is the target of the output rotational speed of the travel drive source when the state of the stepless transmission changes from the disengaged state in which the transmission of the rotational drive force from an input member of the one-way clutch to an output member of the one-way clutch is prevented to the engaged state in which the rotational drive force is transmitted from the input member to the output member.

A control unit in the stepless transmission, in the case where the stepless transmission is in the disengaged state, controls the travel drive source so that the output rotational speed of the travel drive source is a second target rotational speed lower than the first target rotational speed, and controls the transmission gear ratio of the stepless transmission to be such a transmission gear ratio that is the boundary where the state of the stepless transmission in the case where the output rotational speed of the travel drive source is the first target rotational speed changes from the disengaged state to the engaged state.

Therefore, for example when the vehicle is decelerated while the state of the stepless transmission is the disengaged state, the control unit performs control of increasing the transmission gear ratio of the stepless transmission according to the deceleration (control of shifting to a low side).

Moreover, in the case where the state of the stepless transmission changes from the disengage state to the engage state, the control unit in the stepless transmission controls the travel drive source so that the output rotational speed of the travel drive source is the first target rotational speed.

CITATION LIST

Patent Literature

Patent Literature 1: Japanese Patent Application Laid-Open No. 2013-47492

SUMMARY OF INVENTION

Technical Problem

In the stepless transmission described in Patent Literature 1, however, there is the following possibility: if the control of increasing the transmission gear ratio of the stepless transmission according to the deceleration when the vehicle is decelerated in the case where the state of the stepless transmission is the disengaged state is delayed, the rotational speed of the input member cannot be decreased sufficiently, which causes the stepless transmission to change from the disengaged state to the engaged state. Thus, the drive force of the travel drive source may be transmitted to the drive wheels despite the driver's intention to decelerate the vehicle.

The present invention has been made in view of the above, and has an object of providing a stepless transmission that can prevent the drive force of the travel drive source from being transmitted to the drive wheels despite the driver's intention when the vehicle is decelerated.

Solution to Problem

The present invention is a stepless transmission including: an input portion to which a rotational drive force from a travel drive source is transmitted; an output portion that transmits a rotational drive force to a drive wheel; a transmission portion that changes the rotational drive force from the input portion, and transmits the changed rotational drive force to the output portion; a one-way rotation blocking mechanism that includes a first element connectable to the transmission portion and a second element connectable to the output portion, and locks the first element to the second element when the first element tries to relatively rotate to one side with respect to the second element, and lets the first element idle with respect to the second element when the first element tries to relatively rotate to the other side with respect to the second element; and a control unit that controls a transmission gear ratio of the stepless transmission, wherein a first target rotational speed is defined, the first target rotational speed being a target of an output rotational speed of the travel drive source when a state of the stepless transmission changes from a first state in which transmission of the rotational drive force from the first element to the second element is prevented to a second state in which the rotational drive force is transmitted from the first element to the second element, and wherein the control unit: when a required drive force of a vehicle is 0, controls the travel drive source so that the output rotational speed of the travel drive source is a second target rotational speed lower than the first target rotational speed, and controls the transmission gear ratio of the stepless transmission to be a transmission gear ratio which is a boundary where the state of the stepless transmission in the case where the output rotational speed of the travel drive source is the first target rotational speed changes from the first state to the second state; and when the required drive force of the vehicle is 0 and a travel speed of the vehicle is less than a predetermined speed, controls the transmission gear ratio of the stepless transmission to be a predetermined transmission gear ratio that enables the first state to be maintained even in the case where the vehicle is decelerated.

In the stepless transmission according to the present invention, the drive force is transmitted from the first element to the second element (i.e. from the input portion to the output portion) (that is, the state of the stepless transmission is the second state), during the period from when the rotational speed of the first element exceeds the rotational speed of the second element to when the torsion (torsion of a few degrees) of the one-way rotation blocking mechanism after the rotational speed of the first element falls below the rotational speed of the second element is released. The state of the stepless transmission is thus maintained at the first state, as the rotational speed of the first element is maintained to be lower than or equal to the rotational speed at the boundary of the change from the first state to the second state.

The rotational speed of the first element is lower when the output rotational speed of the travel drive source is lower. Accordingly, when the required drive force of the vehicle is 0, the control unit controls the travel drive source so that the output rotational speed of the travel drive source is the second target rotational speed lower than the first target rotational speed, thereby maintaining the state of the stepless transmission at the first state.

To prevent, when the vehicle is decelerated, the state of the stepless transmission from changing from the first state to the second state while maintaining the constant output rotational speed of the travel drive source, the control unit only needs to increase the transmission gear ratio of the stepless transmission in order to decrease the rotational speed of the first element. There is, however, a possibility that, in the case where the increase of the transmission gear ratio in response to the deceleration of the vehicle is too late due to a control delay or the like, the rotational speed of the first element cannot be decreased sufficiently and as a result exceeds the rotational speed of the second element, causing the state of the stepless transmission to change from the first state to the second state.

In the case where the transmission gear ratio of the stepless transmission is such a transmission gear ratio that is the above-mentioned boundary when the output rotational speed of the travel drive source is the first target rotational speed, if the output rotational speed of the travel drive source is maintained at the second target rotational speed, the deceleration of the vehicle until the state of the stepless transmission changes from the first state to the second state is smaller when the travel speed of the vehicle is lower. Hence, the possibility that the state of the stepless transmission changes from the first state to the second state is higher when the travel speed of the vehicle is lower.

Accordingly, when the required drive force of the vehicle is 0 and the travel speed of the vehicle is less than the predetermined speed, the control unit controls the transmission gear ratio of the stepless transmission to be the predetermined transmission gear ratio that enables the first state to be maintained even in the case where the vehicle is decelerated. In other words, the control unit controls the transmission gear ratio of the stepless transmission so that the rotational speed of the first element is kept from exceeding the rotational speed of the second element (i.e. so that the first state can be maintained), even in the case where the rotational speed of the second element decreases according to the deceleration of the vehicle.

By preventing the state of the stepless transmission from changing from the first state to the second state due to the deceleration of the vehicle in this way, it is possible to prevent the rotational drive force of the travel drive source from being transmitted to the drive wheel despite the driver's intention to decelerate the vehicle.

In the present invention, preferably, the predetermined transmission gear ratio is a first transmission gear ratio when the drive wheel is braked, and a second transmission gear ratio smaller than the first transmission gear ratio when the drive wheel is not braked, and the second transmission gear ratio is larger than the transmission gear ratio which is the boundary where the state of the stepless transmission changes from the first state to the second state. With this structure, the transmission gear ratio is larger in the case where the drive wheel is braked as compared with the case where the drive wheel is not braked, so that the amount of change of the transmission gear ratio when the state of the stepless transmission changes from the first state to the second state can be reduced in the case where the drive wheel is not braked as compared with the case where the drive wheel is braked. This eases the change of the state of the stepless transmission from the first state to the second state in the case where the drive wheel is not braked as compared with the case where the drive wheel is braked.

In the present invention, preferably, the transmission gear ratio is able to be set to infinity, and the first transmission gear ratio is infinity. With this structure, in the case where the transmission gear ratio of the stepless transmission is infinity, the rotational speed of the first element is 0 regardless of the output rotational speed of the travel drive source. In such a case, the rotational drive force is not transmitted from the input side to the output side, and so the state of the stepless transmission is constantly the first state. This more appropriately prevents the rotational drive force of the travel drive source from being transmitted to the drive wheel despite the driver's intention when the vehicle is decelerated.

In the present invention, preferably, the control unit determines the second transmission gear ratio, based on a smaller torque out of an allowable torsion torque of the output portion when the vehicle is in a stopped state and a drive torque of the output portion which is a boundary where the vehicle changes from the stopped state to a travel state. With this structure, the output portion torque does not exceed the allowable torsion torque of the output portion when the vehicle is in the stopped state and the drive torque of the output portion which is the boundary where the vehicle changes from the stopped state to the travel state, thus easing the change of the state of the stepless transmission from the first state to the second state in the case where the drive wheel is not braked as compared with the case where the drive wheel is braked.

In the present invention, the first element may be a swing link rotatably supported by the second element, the transmission portion may be made up of a plurality of lever crank mechanisms each of which converts rotation of the input portion into swinging of the swing link, the stepless transmission may include the one-way rotation blocking mechanism that locks the swing link to the output portion when the swing link tries to relatively rotate to one side with respect to the output portion, and lets the swing link idle with respect to the output portion when the swing link tries to relatively rotate to the other side with respect to the output portion, and each of the lever crank mechanisms may be formed by connecting, by a connecting rod, a rotational radius adjusting mechanism capable of adjusting a rotary portion rotatable about a rotational center axis of the input portion and the swing link.

In the present invention, preferably, the control unit sets the predetermined speed to a higher speed when the deceleration of the vehicle is larger. Note that, in the present invention, "deceleration" is the value obtained by multiplying the acceleration by −1, and indicates the amount of decrease in speed per unit time.

With this structure, the transmission gear ratio of the stepless transmission can be changed to the predetermined transmission gear ratio, in the stage where the deceleration of the vehicle until the state of the stepless transmission changes from the first state to the second state is large. This more effectively prevents the rotational drive force of the travel drive source from being transmitted to the drive wheel despite the driver's intention to decelerate the vehicle, even in the case where the control of changing the transmission gear ratio is delayed.

BRIEF DESCRIPTION OF DRAWINGS

FIGS. 3A to 3D are explanatory diagrams illustrating changes in rotational radius of the rotational radius adjusting mechanism in the embodiment.

FIG. 4A illustrates the swing angle of the swing motion of the swing link in the case where the rotational radius is maximum, FIG. 4B illustrates the swing angle of the swing motion of the swing link in the case where the rotational radius is medium, and FIG. 4C illustrates the swing angle of the swing motion of the swing link in the case where the rotational radius is small.

FIG. 5 is a graph illustrating changes in angular velocity ω of the swing link with respect to changes in rotational radius of the rotational radius adjusting mechanism in the embodiment.

FIG. 6 is a graph illustrating the state in which an output shaft is rotated by six lever crank mechanisms that differ in phase by 60 degrees in the stepless transmission in the embodiment.

FIG. 12 is a flowchart illustrating the process of the control device in the embodiment.

DESCRIPTION OF EMBODIMENTS

The following describes an embodiment of a control device of a four-joint link mechanism type stepless transmission according to the present invention. The four-joint link mechanism type stepless transmission in this embodiment is an infinitely variable transmission (IVT), i.e. a type of transmission capable of setting the transmission gear ratio i (i=(the rotational speed of an input shaft)/(the rotational speed of an output shaft)) to infinity (∞) to set the rotational speed of the output shaft to 0.

Figure 1:
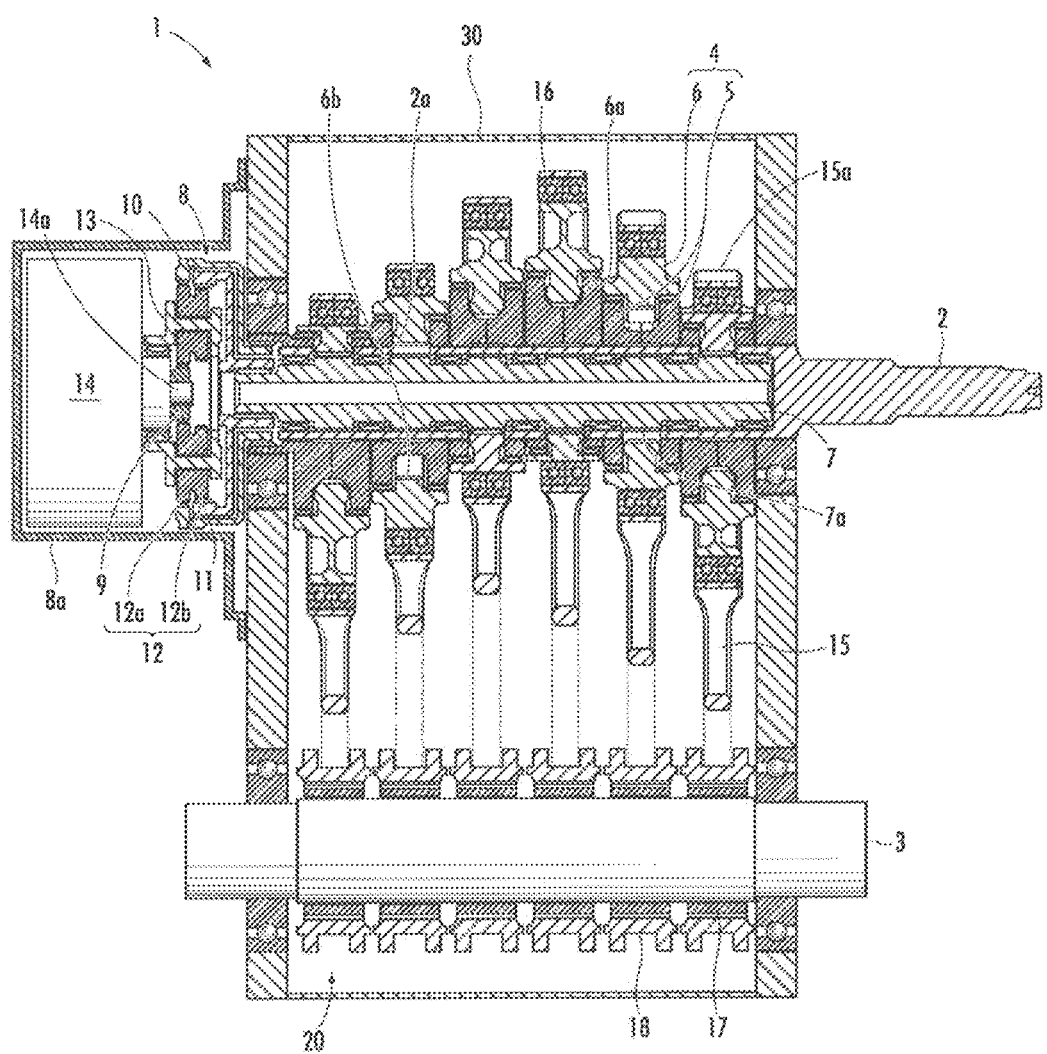
FIG. 1 is a sectional diagram illustrating a stepless transmission in an embodiment of a control device according to the present invention.
Figure 2:
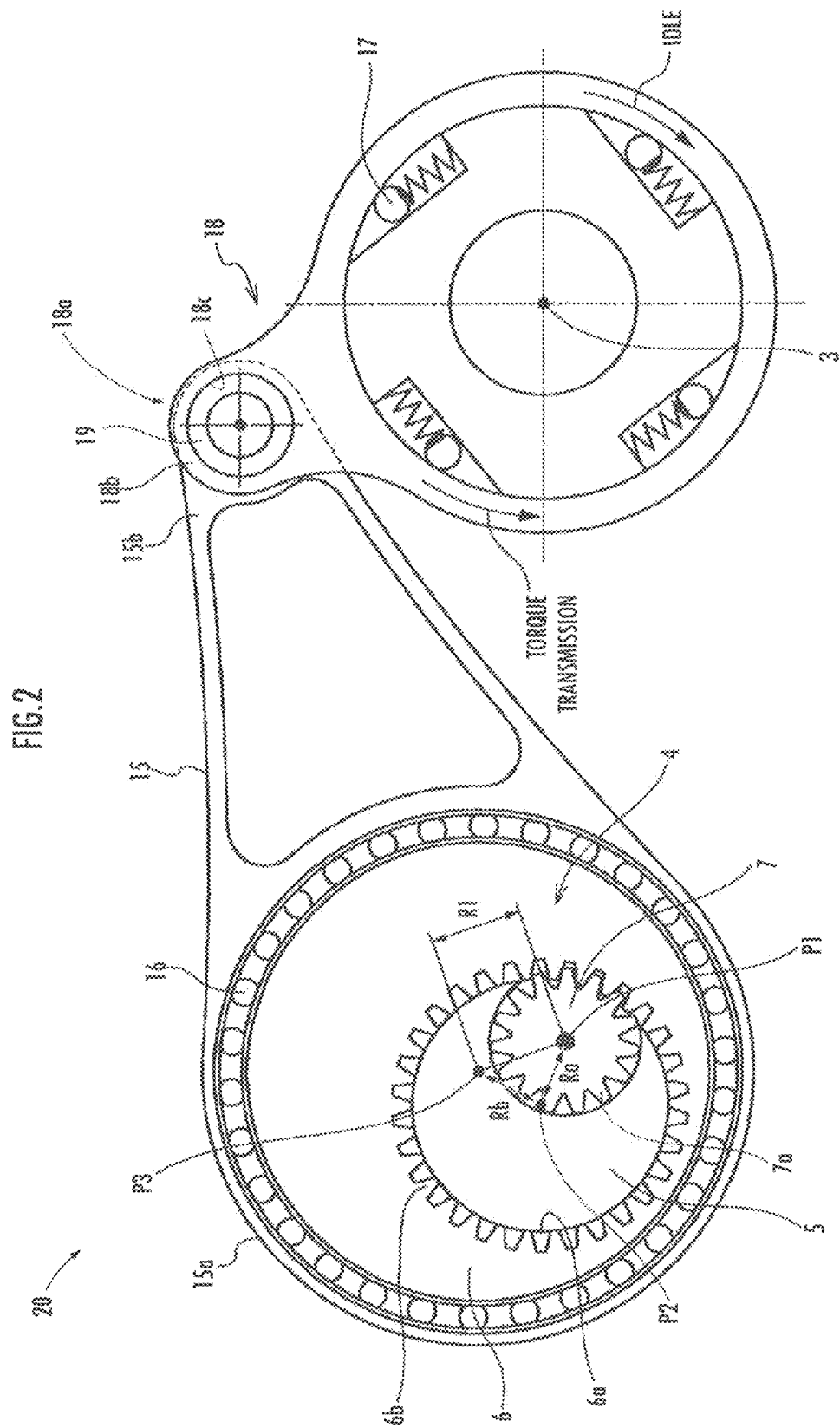
FIG. 2 is an explanatory diagram illustrating a rotational radius adjusting mechanism, a connecting rod, and a swing link in the embodiment from the axial direction.

In FIGS. 1 and 2, a four-joint link mechanism type stepless transmission 1 (also known as a continuous variable transmission) in this embodiment includes: a hollow input shaft 2 (corresponding to the "input portion" in the present invention) that rotates about an input center axis P1 with a rotational drive force received from a travel drive source 50 (see FIG. 7) such as an engine which is an internal-combustion engine or an electric motor; an output shaft 3 (corresponding to the "output portion" and "second element" in the present invention) that is disposed in parallel with the input shaft 2 and transmits rotational motive power to one or more drive wheels 60 (see FIG. 7) of a vehicle through a differential gear, a propeller shaft, etc. not illustrated; and six rotational radius adjusting mechanisms 4 provided on the input shaft 2.

Each rotational radius adjusting mechanism 4 includes a cam disc 5 and a rotary disc 6. The cam disc 5 has a discoid shape. Each pair of cam discs 5 are provided on the input shaft 2 so as to be rotatable integrally with the input shaft 2 in a state of being eccentric with respect to the input center axis P1. The pairs of cam discs 5 have their phases shifted by 60 degrees from each other, and arranged so that the six pairs of cam discs 5 form a circle around the input shaft 2 in the circumferential direction. The discoid rotary disc 6 is externally fitted to the pair of cam discs 5 in an eccentric state so as to be rotatable. The rotary disc 6 has a receiving hole 6a for receiving each cam disc 5.

When the center point of each cam disc 5 is denoted by P2 and the center point of the rotary disc 6 is denoted by P3, the rotary disc 6 is eccentric with respect to each cam disc 5 so that the distance Ra between the input center axis P1 and the center point P2 and the distance Rb between the center point P2 and the center point P3 are the same.

The receiving hole 6a of the rotary disc 6 is provided with internal teeth 6b between the pair of cam discs 5. The input shaft 2 has a cutout hole 2a that is positioned between the pair of cam discs 5 and provides communication between the inner peripheral surface and the outer peripheral surface at the location opposing the eccentric direction of the cam discs 5.

A pinion shaft 7 that is concentric with the input shaft 2 and has external teeth 7a at the location corresponding to the rotary disc 6 is disposed in the hollow input shaft 2, so as to be rotatable relative to the input shaft 2. The external teeth 7a of the pinion shaft 7 mesh with the internal teeth 6b of the rotary disc 6 through the cutout hole 2a of the input shaft 2.

The pinion shaft 7 is connected with a differential mechanism 8. The differential mechanism 8 is composed of a planetary gear mechanism, and includes: a sun gear 9; a first ring gear 10 connected to the input shaft 2; a second ring gear 11 connected to the pinion shaft 7; and a carrier 13 that pivotally supports, in a rotatable and revolvable manner, a stepped pinion 12 composed of a large-diameter section 12a that meshes with the sun gear 9 and the first ring gear 10 and a small-diameter section 12b that meshes with the second ring gear 11.

The sun gear 9 is connected to a rotating shaft 14a of an adjustment drive source 14 composed of an electric motor for the pinion shaft 7. In the case where the rotational speed of the adjustment drive source 14 and the rotational speed of the input shaft 2 are the same, the sun gear 9 and the first ring gear 10 rotate at the same speed. As a result, the four elements, namely, the sun gear 9, the first ring gear 10, the second ring gear 11, and the carrier 13, are put in a locked state in which relative rotation is disabled, and the pinion shaft 7 connected to the second ring gear 11 rotates at the same speed as the input shaft 2.

In the case where the rotational speed of the adjustment drive source 14 is lower than the rotational speed of the input shaft 2, the number of rotations of the carrier 13 is (j·NR1+Ns)/(j+1), where Ns denotes the number of rotations of the sun gear 9, NR1 denotes the number of rotations of the first ring gear 10, and j denotes the gear ratio of the sun gear 9 and the first ring gear 10 ((the number of teeth of the first ring gear 10)/(the number of teeth of the sun gear 9)). Further, the number of rotations of the second ring gear 11 is {j(k+1)NR1+(k−j)Ns}/{k(j+1)}, where k denotes the gear ratio of the sun gear 9 and the second ring gear 11 ((the number of teeth of the second ring gear 11)/(the number of teeth of the sun gear 9)×(the number of teeth of the large-diameter section 12a of the stepped pinion 12)/(the number of teeth of the small-diameter section 12b of the stepped pinion 12)).

In the case where the rotational speed of the input shaft 2 to which each cam discs 5 is fixed and the rotational speed of the pinion shaft 7 are the same, the rotary disc 6 rotates integrally with the cam disc 5. In the case where the rotational speed of the input shaft 2 and the rotational speed of the pinion shaft 7 are different, the rotary disc 6 rotates around the peripheral edges of the cam disc 5 about the center point P2 of the cam disc 5.

As illustrated in FIG. 2, the rotary disc 6 is eccentric with respect to each cam disc 5 so that the distance Ra and the distance Rb are the same. Hence, the center point P3 of the rotary disc 6 can be positioned on the same axis as the input center axis P1 to set the distance between the input center axis P1 and the center point P3, i.e. the amount of eccentricity R1, to 0.

A large-diameter annular section 15a of a connecting rod 15 is externally fitted to the peripheral edges of the rotary disc 6 so as to be rotatable, through a connecting rod bearing 16 made up of ball bearings. The connecting rod 15 has the large-diameter annular section 15a having a large diameter at one end, and a small-diameter annular section 15b smaller in diameter than the large-diameter annular section 15a at the other end. The output shaft 3 is provided with six swing links 18 (corresponding to the "first element" in the present invention) corresponding to the connecting rods 15, each through a one-way clutch 17 as a one-way rotation blocking mechanism.

The one-way clutch 17 as the one-way rotation blocking mechanism is provided between the corresponding swing link 18 and the output shaft 3, to lock the swing link 18 to the output shaft 3 when the swing link 18 tries to relatively rotate to one side with respect to the output shaft 3 and let the swing link 18 idle with respect to the output shaft 3 when the swing link 18 tries to relatively rotate to the other side. The swing link 18 is swingable relative to the output shaft 3, when let to idle with respect to the output shaft 3 by the one-way clutch 17.

The swing link 18 is annular, and has a swing end 18a connected to the small-diameter annular section 15b of the connecting rod 15 in its upper part. The swing end 18a has a pair of protruding pieces 18b that protrude so as to sandwich the small-diameter annular section 15b in the axial direction. The pair of protruding pieces 18b have a through hole 18c that matches the inside diameter of the small-diameter annular section 15b. A connecting pin 19 is inserted into the through hole 18c and the small-diameter annular section 15b. The connecting rod 15 and the swing link 18 are connected in this way.

FIG. 3A to FIG. 3D illustrates the positional relationship between the pinion shaft 7 and the rotary disc 6 when the amount of eccentricity R1 of the rotational radius adjusting mechanism 4 is changed. FIG. 3A illustrates the state in which the amount of eccentricity R1 is set to "maximum". The pinion shaft 7 and the rotary disc 6 are positioned so that the input center axis P1, the center point P2 of the cam disc 5, and the center point P3 of the rotary disc 6 are aligned. The transmission gear ratio i in this case is minimum.

FIG. 3B illustrates the state in which the amount of eccentricity R1 is set to "medium," which is smaller than that in FIG. 3A. FIG. 3C illustrates the state in which the amount of eccentricity R1 is set to "small," which is smaller than that in FIG. 3B. The transmission gear ratio i in FIG. 3B is "medium," which is larger than the transmission gear ratio i in FIG. 3A. The transmission gear ratio i in FIG. 3C is "large," which is larger than the transmission gear ratio i in FIG. 3B. FIG. 3D illustrates the state in which the amount of eccentricity R1 is set to "0", where the input center axis P1 and the center point P3 of the rotary disc 6 are concentric. The transmission gear ratio i in this case is infinity (∞). In the stepless transmission 1 in this embodiment, the radius of the rotational motion on the input shaft 2 side can be adjusted by changing the amount of eccentricity R1 by the rotational radius adjusting mechanism 4.

The rotational radius adjusting mechanism 4, the connecting rod 15, and the swing link 18 in this embodiment constitute a lever crank mechanism 20 (a four-joint link mechanism, corresponding to the "transmission portion" in the present invention), as illustrated in FIG. 2. The lever crank mechanism 20 converts the rotational motion of the input shaft 2 into the swing motion of the swing link 18. The stepless transmission 1 in this embodiment includes a total of six lever crank mechanisms 20. If the input shaft 2 is rotated and the pinion shaft 7 is rotated at the same speed as the input shaft 2 when the amount of eccentricity R1 is not 0, each connecting rod 15 repeatedly alternates between pushing the swing end 18a toward the output shaft 3 and pulling the swing end 18a toward the input shaft 2 between the input shaft 2 and the output shaft 3 based on the amount of eccentricity R1 while shifting the phase by 60 degrees, to swing the swing link 18.

The small-diameter annular section 15b of the connecting rod 15 is connected to the swing link 18 provided around the output shaft 3 via the one-way clutch 17. Hence, in the case where the swing link 18 swings by being pushed or pulled by the connecting rod 15, the output shaft 3 rotates only when the swing link 18 rotates in one of the pushing direction and the pulling direction, and the force of the swing motion of the swing link 18 is not transmitted to the output shaft 3 and the swing link 18 idles when the swing link 18 rotates in the other one of the pushing direction and the pulling direction. The rotational radius adjusting mechanisms 4 are disposed with the phase being shifted by every 60 degrees, so that the output shaft 3 is rotated in order by the rotational radius adjusting mechanisms 4.

Figure 4A:
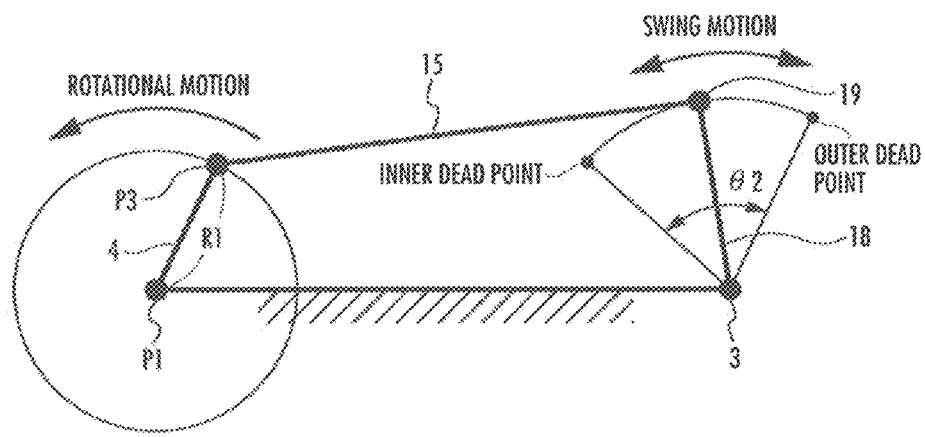
FIGS. 4A to 4C are explanatory diagrams illustrating the relationship between the changes in rotational radius of the rotational radius adjusting mechanism and the swing angle θ2 of the swing motion of the swing link in the embodiment, where
Figure 4B:
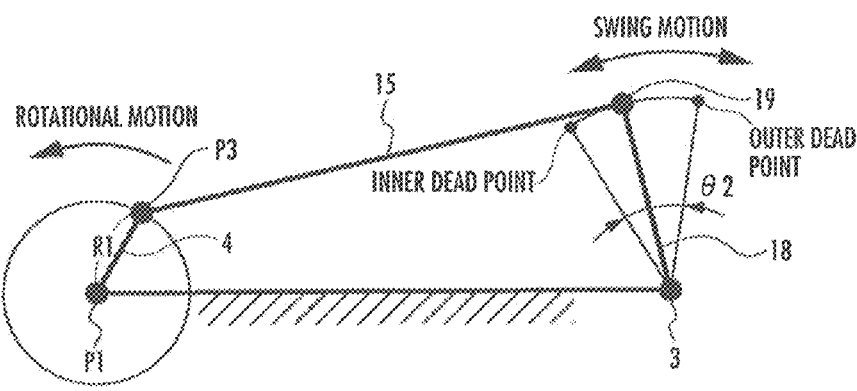
Figure 4C:
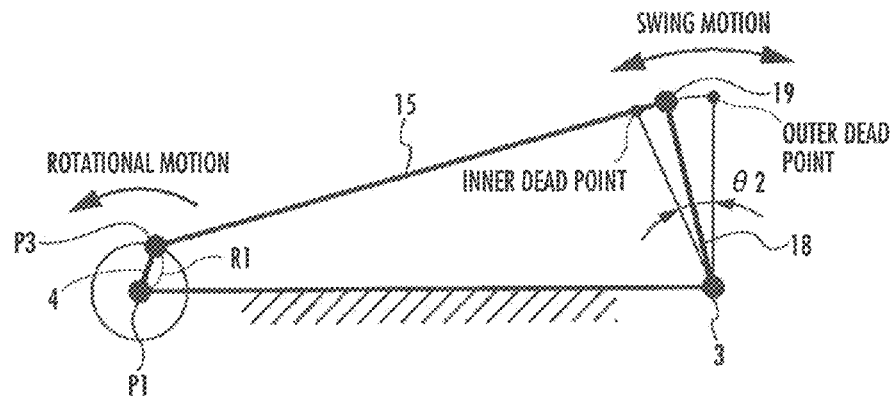

FIG. 4A illustrates the swing range θ2 of the swing link 18 with respect to the rotational motion of the rotational radius adjusting mechanism 4 when the amount of eccentricity R1 is "maximum" in FIG. 3A (when the transmission gear ratio i is minimum). FIG. 4B illustrates the swing range θ2 of the swing link 18 with respect to the rotational motion of the rotational radius adjusting mechanism 4 when the amount of eccentricity R1 is "medium" in FIG. 3B (when the transmission gear ratio i is medium). FIG. 4C illustrates the swing range θ2 of the swing link 18 with respect to the rotational motion of the rotational radius adjusting mechanism 4 when the amount of eccentricity R1 is "small" in FIG. 3C (when the transmission gear ratio i is large). As is clear from FIGS. 4A to 4C, the swing range θ2 of the swing link 18 is narrower when the amount of eccentricity R1 is smaller. When the amount of eccentricity R1 is 0, the swing link 18 does not swing. In this embodiment, in the swing range θ2 of the swing end 18a of the swing link 18, the position closest to the input shaft 2 is referred to as an inner dead point, and the position farthest from the input shaft 2 as an outer dead point.

FIG. 5 is a diagram illustrating the relationship of the changes of the angular velocity ω of the swing link 18 with the changes of the amount of eccentricity R1 of the rotational radius adjusting mechanism 4 in the stepless transmission 1. The horizontal axis represents the rotational angle θ of the rotational radius adjusting mechanism 4, and the vertical axis represents the angular velocity ω of the swing link 18. The angular velocity ω of the swing link 18 (more specifically, the angular velocity ω of the swing end 18a the swing link 18) corresponds to the "rotational speed of the first element" in the present invention. As is clear from FIG. 5, the angular velocity ω of the swing link 18 is larger when the amount of eccentricity R1 is larger (the transmission gear ratio i is smaller).

FIG. 6 illustrates the angular velocity ω of each swing link 18 with respect to the rotational angle θ1 of the corresponding rotational radius adjusting mechanism 4 when the six rotational radius adjusting mechanisms 4, the phases of which are different from each other by 60 degrees, are rotated (when the input shaft 2 and the pinion shaft 7 are rotated at the same speed). As illustrated in FIG. 6, the six lever crank mechanisms 20 enable smoother rotation of the output shaft 3.

Figure 7:
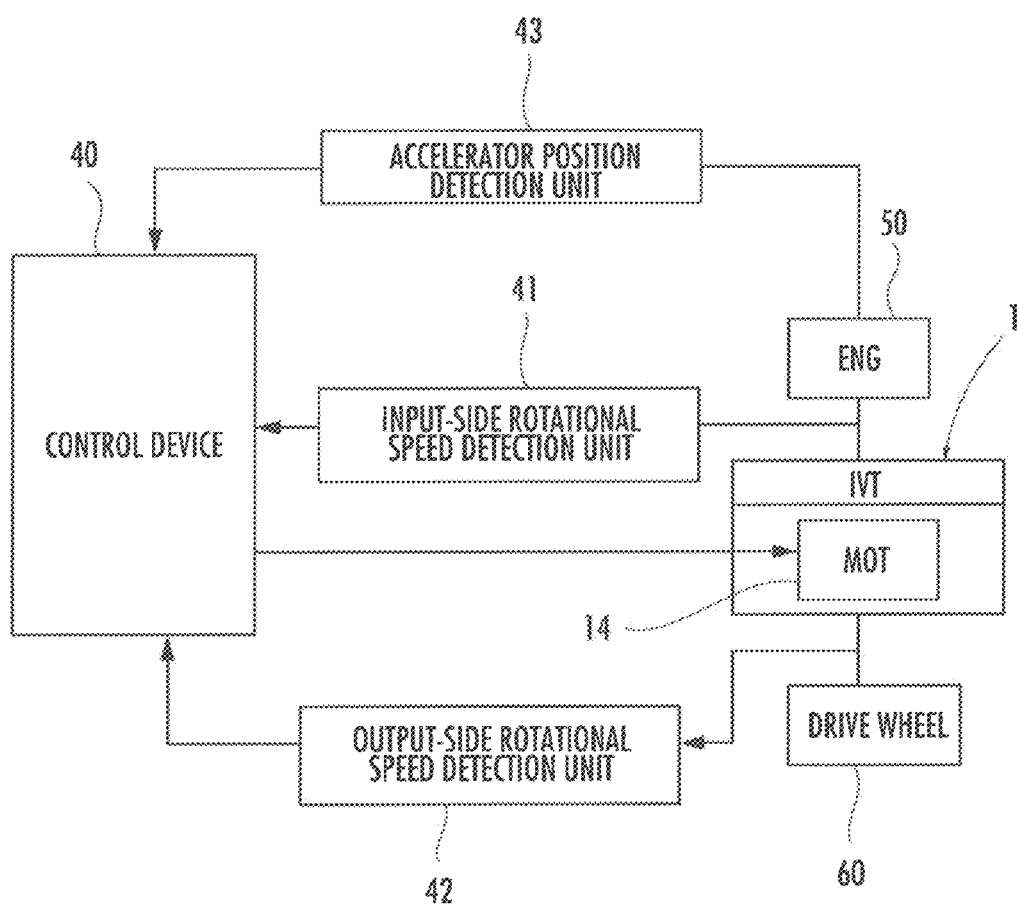
FIG. 7 is a functional block diagram illustrating the structure of the control device in the stepless transmission in the embodiment.

The stepless transmission 1 also includes a control device 40 (corresponding to the "control unit" in the present invention) (see FIG. 7). The control device 40 is an electronic unit including a CPU, memory, and the like, and controls the operations of the travel drive source 50 and adjustment drive source 14 by the CPU executing control programs for the stepless transmission 1 and the travel drive source 50 stored in the memory. The control device 40 also controls the operation of the adjustment drive source 14 to realize the function of controlling the amount of eccentricity of each rotational radius adjusting mechanism 4.

FIG. 7 is a functional block diagram of the stepless transmission and the control device 40 for controlling the stepless transmission 1 in this embodiment.

The control device 40 receives respective output signals from: an input-side rotational speed detection unit 41 (e.g. a rotational speed sensor) that detects the rotational speed on the input side; an output-side rotational speed detection unit 42 (e.g. a rotational speed sensor) that detects the rotational speed on the output side; and an accelerator position detection unit 43 that detects the opening of a throttle valve according to the operation amount of an accelerator pedal (not illustrated).

The control device 40 detects the rotational speed on the input side from the output signal of the input-side rotational speed detection unit 41. Though the rotational speed on the input side is the output rotational speed Ne of the travel drive source 50 in this embodiment, the rotational speed on the input side may be, for example, the rotational speed of the input shaft 2 or swing link 18. The control device 40 calculates the transmission gear ratio i of the stepless transmission 1 from the current amount of eccentricity R1, and multiplies the detected output rotational speed Ne (the unit of which is rpm as an example) of the travel drive source 50 by $2\pi/i$, to detect the angular velocity (the unit of which is rad/s as an example) of the swing link 18 (more specifically, the swing end 18a).

The control device 40 detects the rotational speed on the output side from the output signal of the output-side rotational speed detection unit 42. Though the rotational speed on the output side is the rotational speed of the output shaft 3 in this embodiment, the rotational speed on the output side may be, for example, the rotational speed of the drive wheels 60. The control device 40 multiplies the detected rotational speed (the unit of which is rpm as an example) of the output shaft 3 by $2\pi$, to detect the angular velocity (the unit of which is rad/s as an example) on the output side. The control device 40 also detects the travel speed (hereafter referred to as "vehicle speed") V (the unit of which is km/h as an example) of the vehicle, based on the rotational speed of the output shaft 3 and the transmission gear ratio i_fg between the output shaft 3 and the drive wheels 60.

The control device 40 further detects the required drive force of the vehicle, from the output signal of the accelerator position detection unit 43. In the case where the opening of the throttle vale is 0 (any value substantially equal to 0 in consideration of errors is treated as 0), the control device 40 detects that the required drive force of the vehicle is 0 (the accelerator pedal is off, that is, coasting). In the case where the opening of the throttle valve is larger than 0, the control device 40 detects the required drive force of the vehicle corresponding to the value of the opening.

Figure 8:
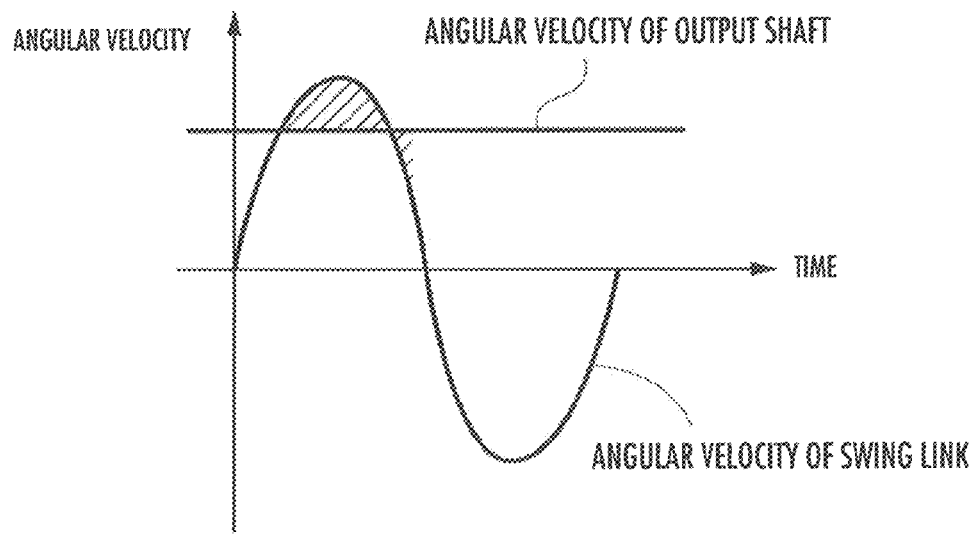
FIG. 8 is a diagram illustrating the relationship between the angular velocity of the swing link and the angular velocity of the output shaft and the first and second states.

FIG. 8 illustrates the relationship between the angular velocity ω of one swing link 18 (swing end 18a) and the angular velocity of the output shaft 3. The horizontal axis represents the time, and the vertical axis represents the angular velocity. As illustrated by hatching in FIG. 8A, the drive force is transmitted from the input shaft 2 to the output shaft 3 via the lever crank mechanism 20 in the region where the angular velocity ω of the swing link 18 exceeds the angular velocity of the output shaft 3 and the region where the torsion (torsion of a few degrees) of the one-way clutch 17 after the angular velocity ω of the swing link 18 falls below the angular velocity of the output shaft 3 is released.

Hereafter, the state of the stepless transmission 1 in which the drive force is transmitted from the input shaft 2 to the output shaft 3 is referred to as a "second state" (the second state is the engaged state), and the state of the stepless transmission 1 in which the drive force is not transmitted from the input shaft 2 to the output shaft 3 is referred to as a "first state" (the first state is the disengaged state).

A first target rotational speed Ne1 is defined in the stepless transmission 1. The first target rotational speed Ne1 is the target of the output rotational speed Ne of the travel drive source 50 when the state of the stepless transmission 1 changes from the first state to the second state.

The control device 40 controls the travel drive source 50 so that the output rotational speed Ne of the travel drive source 50 is a second target rotational speed Ne2 lower than the first target rotational speed Ne1, when the required drive force of the vehicle is 0.

The stepless transmission 1 includes the one-way clutch 17 that enables the transmission of the rotational drive force of the input shaft 2 to the output shaft 3 and prevents the transmission of the rotational drive force of the output shaft 3 to the input shaft 2 on the power transmission path between the input shaft 2 and the output shaft 3. Accordingly, when the required drive force of the vehicle is 0 (when the vehicle is coasting, that is, when the drive wheels 60 are rotating by inertia), the rotational drive force transmitted from the drive wheels 60 to the output shaft 3 is not transmitted to the input shaft 2.

This raises the need to maintain the operation of the travel drive source 50 by consuming fuel when the required drive force is 0. Hence, the control device 40 controls the travel drive source 50 so that the output rotational speed of the travel drive source 50 is a low rotational speed (the second target rotational speed Ne2) from among the rotational speeds enabling the operation of the travel drive source 50 to be maintained, when the required drive force is 0. The fuel consumption is reduced in this way.

The control device 40 also performs control of setting the transmission gear ratio i of the stepless transmission 1 to a non-driving transmission gear ratio I0 in addition to the above-mentioned control (the control of setting Ne to Ne2), when the required drive force of the vehicle is 0. The non-driving transmission gear ratio I0 is such a transmission gear ratio that is the boundary where the state of the stepless transmission 1 in the case where the output rotational speed Ne of the travel drive source 50 is the first target rotational speed Ne1 (Ne1>Ne2 as mentioned above) changes from the first state to the second state. The amount of eccentricity R1 corresponding to the non-driving transmission gear ratio I0 is referred to as "the non-driving amount of eccentricity R0". The non-driving transmission gear ratio I0 is expressed as Ne1/(V·i_fg).

In detail, in the case where the transmission gear ratio i of the stepless transmission 1 is the non-driving transmission gear ratio I0 and the output rotational speed Ne of the travel drive source 50 is the first target rotational speed Ne1, the state of the stepless transmission 1 is at the boundary of changing from the first state to the second state. In the case where the output rotational speed Ne of the travel drive source 50 is maintained at a rotational speed lower than the first target rotational speed Ne1, the state of the stepless transmission 1 is maintained at the first state.

When the required drive force of the vehicle is 0, the output rotational speed Ne of the travel drive source 50 is the second target rotational speed Ne2 lower than the first target rotational speed Ne1, so that the state of the stepless transmission 1 is the first state. Thus, the rotational drive force of the input shaft 2 is prevented from being transmitted to the output shaft 3 (that is, the rotational drive force of the travel drive source 50 is prevented from being transmitted to the drive wheels 60) despite the driver's intention, when the required drive force is 0.

The difference between the first target rotational speed Ne1 and the second target rotational speed Ne2 is set to be less than or equal to a predetermined value. The predetermined value is set to, by experiments conducted beforehand, such a value that allows the output rotational speed of the travel drive source 50 to be promptly increased when the required drive force increases from 0 to a value greater than 0 (when the accelerator pedal changes from off to on).

Hence, in the case where the driver operates the accelerator pedal to accelerate the vehicle when the vehicle is coasting as the required drive force of the vehicle is 0, the control device 40 promptly increases the output rotational speed Ne of the travel drive source 50 from Ne2 to Ne1 according to the operation.

The control device 40 can promptly change the state of the stepless transmission 1 whose transmission gear ratio i is the non-driving transmission gear ratio I0 from the first state to the second state, simply by increasing the output rotational speed Ne of the travel drive source 50 to Ne1 in this way.

Figure 9:
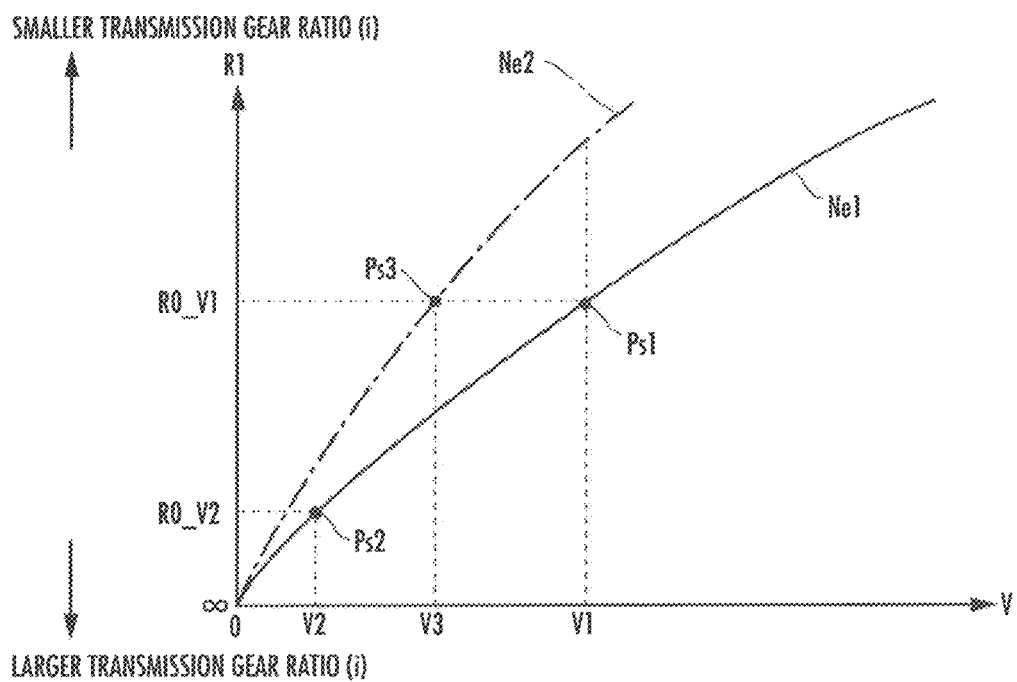
FIG. 9 is a diagram illustrating the relationship between the vehicle speed, the amount of eccentricity, and the output rotational speed of a travel drive source and the first and second states.

The following describes the relationship between the vehicle speed V, the transmission gear ratio i of the stepless transmission 1, and the output rotational speed Ne of the travel drive source 50 and the first state and the second state, with reference to FIG. 9. In FIG. 9, the horizontal axis represents the vehicle speed V (higher toward the right), and the vertical axis represents the amount of eccentricity R1 (larger toward the top, that is, the transmission gear ratio i is smaller toward the top).

The solid line in FIG. 9 indicates the boundary line when the output rotational speed Ne of the travel drive source 50 is the first target rotational speed Ne1. The dashed-dotted line in FIG. 9 indicates the boundary line when the output rotational speed Ne of the travel drive source 50 is the second target rotational speed Ne2. The boundary line mentioned here is the line connecting the boundary points where the state changes from the first state to the second state according to each of the vehicle speed V and the amount of eccentricity R1.

In FIG. 9, when each point (hereafter referred to as a "state point") representing the state of the stepless transmission 1 determined by the vehicle speed V and the amount of eccentricity R1 is on the boundary line (e.g. the solid line when Ne is Ne1, the dashed-dotted line when Ne is Ne2) determined according to the value of the current output rotational speed Ne of the travel drive source 50 or in the region on the lower right side of the boundary line as indicated by Ps1 to Ps3, the state of the stepless transmission 1 is the first state. When the state point is in the region on the upper left side of the boundary line in FIG. 9, on the other hand, the state of the stepless transmission 1 is the second state.

As illustrated in FIG. 9, in the case where the output rotational speed Ne of the travel drive source 50 is constant, the boundary point is present at a larger amount of eccentricity R1 when the vehicle speed V is higher. In the case where the vehicle speed V is constant, the boundary point is present at a larger amount of eccentricity R1 when the output rotational speed Ne of the travel drive source 50 is lower. Moreover, the distance between the boundary point when the output rotational speed Ne of the travel drive source 50 is the first target rotational speed Ne1 and the boundary point when the output rotational speed Ne of the travel drive source 50 is the second target rotational speed Ne2 is smaller when the vehicle speed V is lower.

The following describes, as an example, the case of decelerating the vehicle when the vehicle is coasting with the vehicle speed V at V1 while the required drive force is 0, with reference to FIG. 9. Here, the non-driving transmission gear ratio I0 and the non-driving amount of eccentricity R0 when the output rotational speed Ne of the travel drive source 50 is the first target rotational speed Ne1 and the vehicle speed V is "XX" ("XX" is a sign representing the vehicle speed) are defined as I0_XX and R0_XX, respectively. For example, when the output rotational speed Ne of the travel drive source 50 is the first target rotational speed Ne1 and the vehicle speed V is V1, the non-driving transmission gear ratio I0 is I0_V1 and the non-driving amount of eccentricity R0 is R0_V1.

When the required drive force is 0, the control device 40 controls the travel drive source 50 so that the output rotational speed Ne of the travel drive source 50 is the second target rotational speed Ne2, and controls the adjustment drive source 14 so that the transmission gear ratio i of the stepless transmission 1 is the non-driving transmission gear ratio I0_V1 (i.e. the amount of eccentricity R1 is the non-driving amount of eccentricity R0_V1), as mentioned earlier. As a result, the state point remains on the solid line in FIG. 9 (i.e. the state point remains on the lower right side of the dashed-dotted line which is the current boundary line), and the state of the stepless transmission 1 is maintained at the first state.

In this state, for example in the case where the vehicle decelerates from V1 to V2 according to the operation of a braking device (not illustrated), the control device 40 decreases the amount of eccentricity R1 to R0_V2 so that the state point moves from Ps1 to Ps2. There is, however, a possibility that the decrease of the amount of eccentricity R1 cannot keep up with the deceleration of the vehicle due to a control delay or the like.

Even in such a case, since the current output rotational speed Ne of the travel drive source 50 is the second target rotational speed Ne2, the state of the stepless transmission 1 can be maintained at the first state (Ps3) as long as the vehicle speed V is greater than or equal to V3.

However, the boundary point when the output rotational speed Ne of the travel drive source 50 is the first target rotational speed Ne1 and the boundary point when the output rotational speed Ne of the travel drive source 50 is the second target rotational speed Ne2 are closer to each other when the vehicle speed V is lower.

In detail, in the case where the transmission gear ratio i of the stepless transmission 1 is the non-driving transmission gear ratio I0 and the output rotational speed Ne of the travel drive source 50 is maintained at the second target rotational speed Ne2, the deceleration of the vehicle until the state of the stepless transmission 1 changes from the first state to the second state is smaller when the vehicle speed V is lower. Therefore, if the vehicle is decelerated when the required drive force of the vehicle is 0, the state of the stepless transmission changes from the first state to the second state more easily when the vehicle speed V is lower.

This increases the possibility of the change of the state of the stepless transmission 1 from the first state to the second state (i.e. the state point being located on the upper left side of the dashed-dotted boundary line in FIG. 9) due to, for example, a delay in the control of the amount of eccentricity R1 in response to the deceleration of the vehicle, when the vehicle speed V is low.

Accordingly, when the vehicle speed V is lower than a predetermined boundary speed Vgn (corresponding to the "predetermined speed" in the present invention), the control device 40 controls the transmission gear ratio i of the stepless transmission 1 to be a state maintaining transmission gear ratio ign (corresponding to the "predetermined transmission gear ratio" in the present invention) that enables the first state to be maintained, even in the case where the vehicle is decelerated.

The control device 40 further sets the state maintaining transmission gear ratio ign when the drive wheels 60 are braked, to a first transmission gear ratio ign1, and sets the state maintaining transmission gear ratio ign when the drive wheels 60 are not braked, to a second transmission gear ratio ign2 smaller than the first transmission gear ratio ign1. The second transmission gear ratio ign2 is larger than the transmission gear ratio i (non-driving transmission gear ratio I0) which is the boundary where the state of the stepless transmission 1 changes from the first state to the second state.

In this embodiment, the first transmission gear ratio ign1 is set to infinity. Note that the first transmission gear ratio ign1 may be any transmission gear ratio (e.g. a large transmission gear ratio on the low side) other than infinity as long as it enables the first state to be maintained, regardless of whether or not the stepless transmission has a transmission gear ratio that can be set to infinity.

Moreover, in this embodiment, the second transmission gear ratio ign2 is determined based on a smaller output shaft torque T out of the allowable torsion torque (hereafter referred to as the "output shaft allowable torsion torque Tt") of the output shaft 3 when the vehicle is in the stopped state and the drive torque (hereafter referred to as the "output shaft drive torque Td") of the output shaft 3 which is the boundary where the vehicle changes from the stopped state to the travel state.

Figure 10:
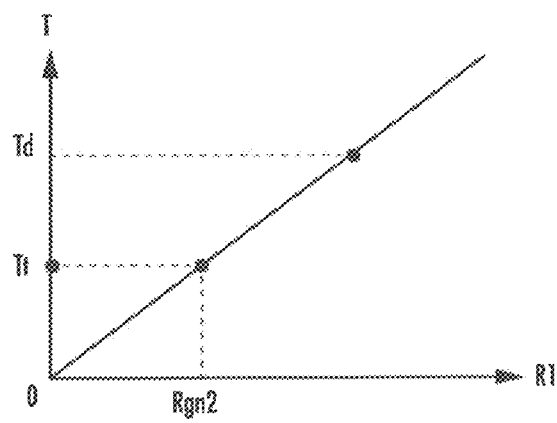
FIG. 10 is a diagram illustrating the relationship between the amount of eccentricity and the output shaft torque in the vehicle stopped state.

The following describes the relationship between the amount of eccentricity R1 and the output shaft torque T, with reference to FIG. 10. In FIG. 10, the horizontal axis represents the amount of eccentricity R1 (larger toward the right), and the vertical axis represents the output shaft torque T (larger toward the top).

The output shaft torque T has a linear relationship with the amount of eccentricity R1 (that is, the output shaft torque T is larger when the amount of eccentricity R1 is larger), as illustrated in FIG. 10. In this embodiment, the output shaft allowable torsion torque Tt is smaller than the output shaft drive torque Td, so that the amount of eccentricity R1 corresponding to the output shaft allowable torsion torque Tt can be defined as a second state maintaining amount of eccentricity Rgn2. Hence, the output shaft torque T does not exceed the output shaft allowable torsion torque Tt and the output shaft drive torque Td.

When the output shaft drive torque Td is larger than the output shaft allowable torsion torque Tt, the amount of eccentricity R1 corresponding to the output shaft drive torque Td can be defined as the second state maintaining amount of eccentricity Rgn2.

While the output shaft allowable torsion torque Tt is fixed depending on the vehicle, the output shaft drive torque Td keeps changing depending on the road surface condition, the vehicle load, the tire friction force, and the like. Accordingly, in this embodiment, the output shaft drive torque Td is determined while assuming beforehand the state with a higher tire friction force than normal, a higher grip road surface than normal, and no vehicle load. Note that the output shaft drive torque Td may be calculated and determined using the tire friction force, the road surface condition, the vehicle load, and the like each time.

Figure 11:
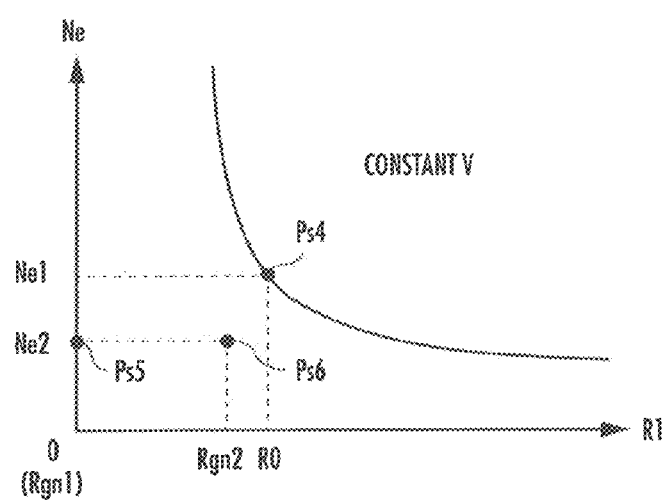
FIG. 11 is a diagram illustrating the relationship between the amount of eccentricity and the output rotational speed of the travel drive source when the vehicle speed is constant.

The following describes the relationship between the amount of eccentricity R1 and the output rotational speed Ne of the travel drive source 50 when the vehicle speed V is constant, with reference to FIG. 11. In FIG. 11, the horizontal axis represents the amount of eccentricity R1 (larger toward the right, i.e. the transmission gear ratio i is smaller toward the right), and the vertical axis represents the output rotational speed Ne of the travel drive source 50 (higher toward the top).

The curve in FIG. 11 indicates the boundary line when the state of the stepless transmission 1 changes from the first state to the second state (that is, the output rotational speed Ne of the travel drive source 50 is inversely correlated with the amount of eccentricity R1). The curved boundary line mentioned here is the line connecting the boundary points where the state changes from the first state to the second state according to each of the amount of eccentricity R1 and the output rotational speed Ne of the travel drive source 50.

In FIG. 11, when each point (hereafter referred to as a "state point") representing the state of the stepless transmission 1 determined by the amount of eccentricity R1 and the output rotational speed Ne of the travel drive source 50 is on the curved boundary line or in the region on the lower left side of the curved boundary line as indicated by Ps4 to Ps6, the state of the stepless transmission 1 is the first state. When the point representing the state of the stepless transmission 1 determined by the amount of eccentricity R1 and the output rotational speed Ne of the travel drive source 50 is in the region on the upper right side of the curved boundary line, on the other hand, the state of the stepless transmission 1 is the second state.

As illustrated in FIG. 11, at the state point Ps4, the amount of eccentricity R1 is the non-driving amount of eccentricity R0 when the output rotational speed Ne of the travel drive source 50 is the first target rotational speed Ne1. At the state point Ps5, the amount of eccentricity R1 is a first state maintaining amount of eccentricity Rgn1 when the output rotational speed Ne of the travel drive source 50 is the second target rotational speed Ne2 in the state where the drive wheels 60 are braked. At the state point Ps6, the amount of eccentricity R1 is the second state maintaining amount of eccentricity Rgn2 when the output rotational speed Ne of the travel drive source 50 is the second target rotational speed Ne2 in the state where the drive wheels 60 are not braked. The second state maintaining amount of eccentricity Rgn2 mentioned here is the amount of eccentricity R1 with which the transmission gear ratio i of the stepless transmission 1 is the second transmission gear ratio ign2.

Here, the change of the amount of eccentricity R1 which is increased from the second state maintaining amount of eccentricity Rgn2 to the non-driving amount of eccentricity R0 when the state point moves from Ps6 to Ps4 is smaller than the change of the amount of eccentricity R1 which is increased from the first state maintaining amount of eccentricity Rgn1 to the non-driving amount of eccentricity R0 when the state point moves from Ps5 to Ps4. Accordingly, the state of the stepless transmission 1 changes from the first state to the second state more easily when the drive wheels 60 are not braked as compared with when the drive wheels 60 are braked (see FIG. 11).

Moreover, in this embodiment, the control device 40 sets the boundary speed Vgn to a higher speed when the deceleration of the vehicle is larger. Hence, the transmission gear ratio i of the stepless transmission 1 can be changed to the state maintaining transmission gear ratio ign, in the stage where the distance between the state point (e.g. Ps1) and the boundary point (the dashed-dotted line in FIG. 9) corresponding to the output rotational speed Ne (Ne2) of the travel drive source 50 is long. This more effectively prevents the rotational drive force of the travel drive source 50 from being transmitted to the drive wheels 60 despite the driver's intention to decelerate the vehicle.

Note that the relationship between the deceleration of the vehicle and the boundary speed Vgn is determined, by experiments and the like beforehand, so as to prevent the state of the stepless transmission 1 from changing from the first state to the second state due to deceleration.

The following describes the control of the amount of eccentricity R1 by the control device 40, with reference to a flowchart in FIG. 12.

In first step ST1, the control device 40 determines whether or not the accelerator pedal is off. In the case of determining that the accelerator pedal is on, the control device 40 advances to step ST2, and performs normal drive control according to the operation amount of the accelerator pedal (i.e. the required drive force).

In the case of determining that the accelerator pedal is off in step ST1, the control device 40 advances to step ST3, and detects the vehicle speed V. The control device 40 then advances to step ST4, and determines the boundary speed Vgn based on the deceleration of the vehicle. In more detail, the control device 40 sets the boundary speed Vgn to a higher speed when the deceleration of the vehicle is larger, as mentioned above. The control device 40 then advances to step ST5, and determines whether or not the vehicle speed V detected in step ST3 is lower than the boundary speed Vgn determined in step ST4.

In the case of determining "No" (V≥Vgn) in step ST5, the control device 40 advances to step ST6, and sets the target amount of eccentricity R1_cmd (the target value of the amount of eccentricity R1) to the non-driving amount of eccentricity R0_V (the non-driving amount of eccentricity R0_V according to the vehicle speed V).

In the case of determining "Yes" (V<Vgn) in step ST5, the control device 40 advances to step ST7, and determines whether or not the drive wheels 60 are braked.

In the case of determining "Yes" (the drive wheels 60 are braked) in step ST7, the control device 40 advances to step ST8, and sets the target amount of eccentricity R1_cmd to the first state maintaining amount of eccentricity Rgn1. The first state maintaining amount of eccentricity Rgn1 mentioned here is the amount of eccentricity R1 with which the transmission gear ratio i of the stepless transmission 1 is the first transmission gear ratio ign1. In this embodiment, the first transmission gear ratio ign1 is infinity, so that the first state maintaining amount of eccentricity Rgn1 is 0. In the case of determining "No" (the drive wheels 60 are not braked) in step ST7, the control device 40 advances to step ST9, and sets the target amount of eccentricity R1_cmd to the second state maintaining amount of eccentricity Rgn2. In this embodiment, the second state maintaining amount of eccentricity Rgn2 is determined based on a smaller output shaft torque T out of the output shaft allowable torsion torque Tt and the output shaft drive torque Td.

After completing the process of steps ST6 to ST9, the control device 40 advances to step ST10, and controls the adjustment drive source 14 so that the actual amount of eccentricity R1_act is the target amount of eccentricity R1_cmd. The control device 40 then advances to step ST11, and determines whether or not the actual amount of eccentricity R1_act is less than or equal to the target amount of eccentricity R1_cmd. In the case of determining "No" (R1_act>R1_cmd), the control device 40 returns to step ST1. In the case of completing the process of step ST2 or determining "Yes" (R1_act≤R1_cmd) in step ST11, the control device 40 ends the process in the flowchart.

Though the stepless transmission 1 has the transmission gear ratio that can be set to infinity in this embodiment, the stepless transmission according to the present invention may be a stepless transmission whose transmission gear ratio cannot be set to infinity.

Though the control device 40 sets the boundary speed Vgn to a higher speed when the deceleration of the vehicle is larger in this embodiment, this is not a limitation, and the boundary speed Vgn of the vehicle may constantly be a fixed speed which is not variable. In such a case, step ST4 in FIG. 12 is omitted. The boundary speed Vgn in this case is determined, by experiments and the like beforehand, so that the state of the stepless transmission 1 can be prevented from being changed from the first state to the second state due to deceleration.

Though whether or not the transmission gear ratio i of the stepless transmission 1 is the state maintaining transmission gear ratio ign is determined based on whether or not the travel speed V of the vehicle is lower than the boundary speed Vgn in this embodiment, the "travel speed of the vehicle" in the present invention includes all values that can substantially indicate the travel speed of the vehicle. For example, the rotational speed on the output side (i.e. the rotational speed (or angular velocity) of the output shaft 3) detected by the output-side rotational speed detection unit 42 is included in the "travel speed of the vehicle" because the travel speed of the vehicle can be represented by the transmission gear ratio i_fg between the output shaft 3 and the drive wheels 60.

Though the output shaft 3 is formed as the output portion and the second element according to the present invention in this embodiment, the output portion and the second element may be separate members.

Though the one-way clutch 17 is used as the one-way rotation blocking mechanism in this embodiment, the one-way rotation blocking mechanism in the present invention is not limited to this. For example, the one-way rotation blocking mechanism may be a two-way clutch capable of switching the rotational direction of the swing link 18 with respect to the output shaft 3 that allows torque transmission from the swing link 18 to the output shaft 3.

Though the rotational radius adjusting mechanism 4 includes the cam discs 5 that rotate integrally with the input shaft 2 and the rotary disc 6 in this embodiment, the rotational radius adjusting mechanism 4 is not limited to this. For example, the rotational radius adjusting mechanism may include: a discoid rotary disc having a through hole pierced eccentrically; a ring gear provided on the inner peripheral surface of the through hole; a first pinion fixed to the input shaft and meshing with the ring gear; a carrier to which the drive force from the adjustment drive source is transmitted; and two second pinions each of which is pivotally supported by the carrier so as to be rotatable and revolvable and meshes with the ring gear.

DESCRIPTION OF REFERENCE NUMERALS 1 stepless transmission
2 input shaft (input portion)
3 output shaft (second element, output portion)
17 one-way clutch (one-way rotation blocking mechanism)
18 swing link (first element, swing link)
20 lever crank mechanism
40 control device (control unit)
50 travel drive source
60 drive wheel
i transmission gear ratio
Ne1 first target rotational speed
Ne2 second target rotational speed
Vgn boundary speed (predetermined speed)
ign state maintaining transmission gear ratio (predetermined transmission gear ratio)
V vehicle speed (travel speed of vehicle)

The invention claimed is:

1. A stepless transmission comprising:
an input portion to which a rotational drive force from a travel drive source is transmitted;
an output portion that transmits a rotational drive force to a drive wheel;
a transmission portion that changes the rotational drive force from the input portion, and transmits the changed rotational drive force to the output portion;
a one-way rotation blocking mechanism that includes a first element connectable to the transmission portion and a second element connectable to the output portion, and locks the first element to the second element when the first element tries to relatively rotate to one side with respect to the second element, and lets the first element idle with respect to the second element when the first element tries to relatively rotate to the other side with respect to the second element; and
a control unit that controls a transmission gear ratio of the stepless transmission,
wherein a first target rotational speed is defined, the first target rotational speed being a target of an output rotational speed of the travel drive source when a state of the stepless transmission changes from a first state in which transmission of the rotational drive force from the first element to the second element is prevented to a second state in which the rotational drive force is transmitted from the first element to the second element, and
wherein the control unit:
when a required drive force of a vehicle is 0, controls the travel drive source so that the output rotational speed of the travel drive source is a second target rotational speed lower than the first target rotational speed, and controls the transmission gear ratio of the stepless transmission to be a transmission gear ratio which is a boundary where the state of the stepless transmission in a case where the output rotational speed of the travel drive source is the first target rotational speed changes from the first state to the second state; and
when the required drive force of the vehicle is 0 and a travel speed of the vehicle is less than a predetermined speed, controls the transmission gear ratio of the stepless transmission to be a predetermined transmission gear ratio that enables the first state to be maintained even in a case where the vehicle is decelerated.

2. The stepless transmission according to claim 1, wherein the predetermined transmission gear ratio is a first transmission gear ratio when the drive wheel is braked, and a second transmission gear ratio smaller than the first transmission gear ratio when the drive wheel is not braked, and
wherein the second transmission gear ratio is larger than the transmission gear ratio which is the boundary where the state of the stepless transmission changes from the first state to the second state.

3. The stepless transmission according to claim 2, wherein the transmission gear ratio is able to be set to infinity, and the first transmission gear ratio is infinity.

4. The stepless transmission according to claim 2, wherein the control unit determines the second transmission gear ratio, based on a smaller torque out of an allowable torsion torque of the output portion when the vehicle is in a stopped state and a drive torque of the output portion which is a boundary where the vehicle changes from the stopped state to a travel state.

5. The stepless transmission according to claim 1, wherein the first element is a swing link rotatably supported by the second element,
wherein the transmission portion is made up of a plurality of lever crank mechanisms each of which converts rotation of the input portion into swinging of the swing link,
wherein the stepless transmission includes the one-way rotation blocking mechanism that locks the swing link to the output portion when the swing link tries to relatively rotate to one side with respect to the output portion, and lets the swing link idle with respect to the output portion when the swing link tries to relatively rotate to the other side with respect to the output portion, and
wherein each of the lever crank mechanisms is formed by connecting, by a connecting rod, a rotational radius adjusting mechanism capable of adjusting a rotational radius of a rotary portion rotatable about a rotational center axis of the input portion and the swing link.

6. The stepless transmission according to claim 1, wherein the control unit sets the predetermined speed to a higher speed when a deceleration of the vehicle is larger.

\* \* \* \* \*